United States Patent

[11] 3,547,103

| [72] | Inventor | William A. Cook |
| | | 300 S. Swain, Bloomington, Ind. 47401 |
| [21] | Appl. No. | 505,669 |
| [22] | Filed | Oct. 29, 1965 |
| [45] | Patented | Dec. 15, 1970 |

[54] COIL SPRING GUIDE
4 Claims, 8 Drawing Figs.

[52] U.S. Cl. ................................................. 128/2.05,
128/303, 128/348
[51] Int. Cl. ..................................................... A61b 5/02;
A61m 25/00
[50] Field of Search .......................................... 128/2.05,
4—7, 341, 343, 303, 328, 348—351, 356, 358;
32/33

[56] References Cited
UNITED STATES PATENTS

| 623,022 | 4/1899 | Johnson | 128/349X |
| 3,416,531 | 12/1968 | Edwards | 128/348 |
| 707,775 | 8/1902 | Harris | 128/349 |
| 812,020 | 2/1906 | Crippen | 27/24 |
| 2,118,631 | 5/1938 | Wappler | 128/349 |
| 2,684,069 | 7/1954 | Donaldson et al. | 128/303 |

OTHER REFERENCES

Jour. Bone & Joint Surgery, Vol. 47-A, 7, October 1965 pp 1428—29, 128—317

Smith et al.—Surgery. Vol. 27, 6, June 1950, pp 817—818 relied on 128—276

U.S.C.I. Catalogue - 1964 pages 29, 32, and 33 relied on (copy in Gp 335)

*Primary Examiner*—Dalton L. Truluck
*Attorney*—Woodard, Weikart, Emhardt & Naughton

ABSTRACT: A coil spring guide having a mandrel therein extending from the proximal end of the guide toward the distal end thereof but terminating at a location spaced from the distal end. A wire extends through the coil spring guide and is secured to the opposite ends thereof. The coil spring and wire are curved at and adjacent the distal end of the coil spring causing the coil spring to define a J-shape. The J-shape is straightened by stretching the proximal end of the coil spring.

INVENTOR.
WILLIAM A. COOK

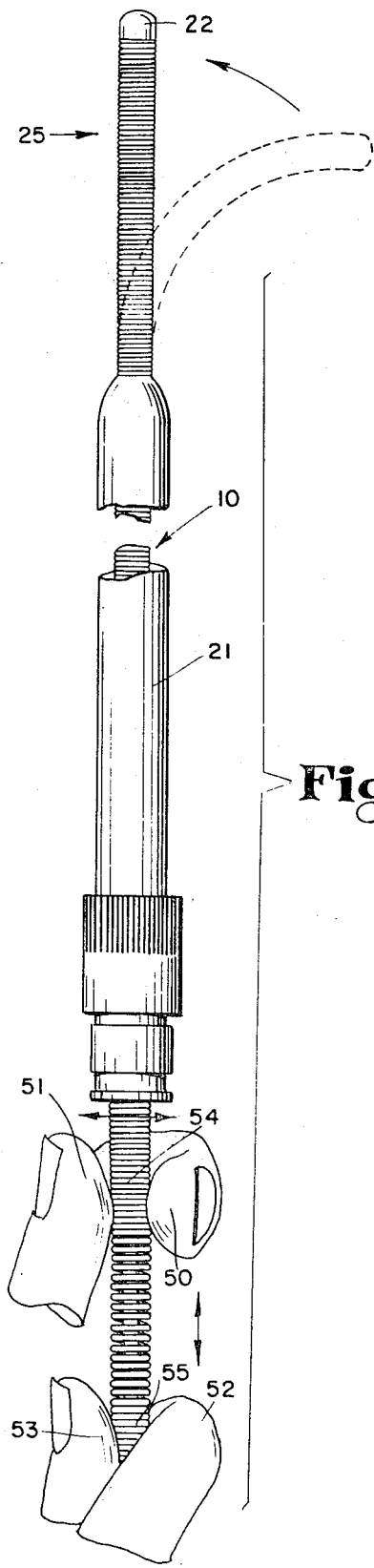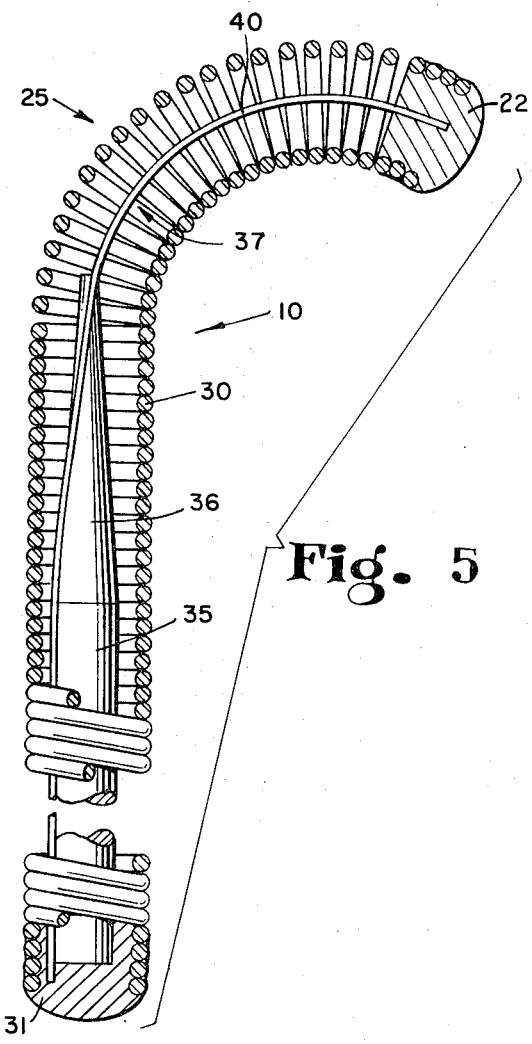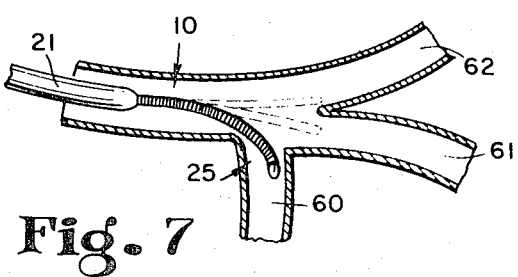

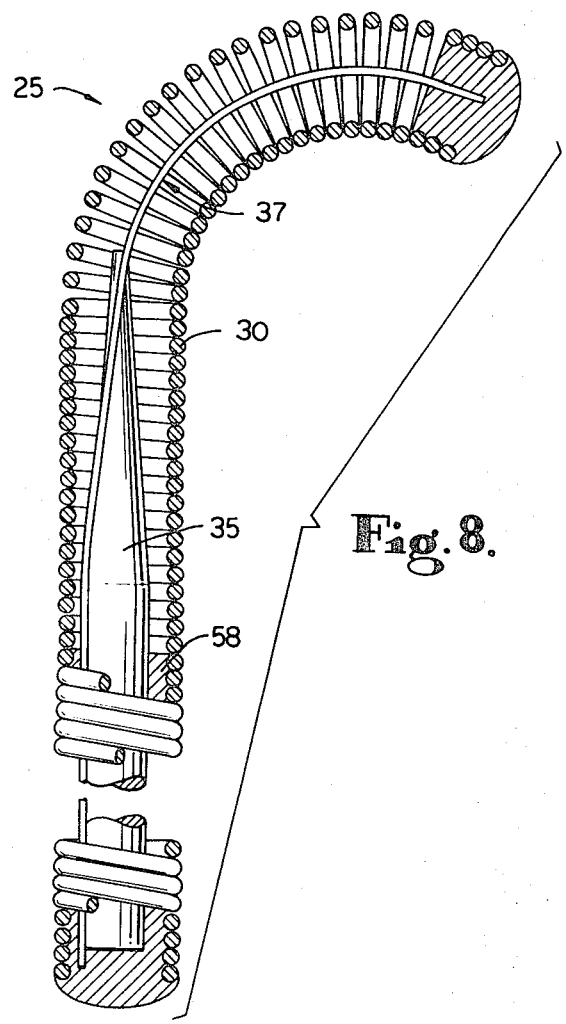

COIL SPRING GUIDE

The present invention relates to coil spring guides for use in cardiovascular disease studies and diagnosis and the like and to a method of using such a coil spring guide.

In the present context the purpose of the coil spring guide is to provide a certain amount of rigidity to a plastic tube when inserted and advanced in the vessels of the body. The guide also functions to provide a flexible tip in front of the tube or catheter in order to prevent inadvertent puncture of the vessel when the catheter is being moved therethrough.

Such a coil spring guide may be used in a procedure known as catheterization by the percutaneous entry technique. The instruments used in such a procedure or technique are the coil spring guide, a long hypodermic needle, a sharp point for the needle and a plastic tube or catheter. The needle is injected into a selected vessel which is normally the femoral artery or vein of the leg. The sharp point for the needle is then removed and the coil spring guide is inserted through the lumen of the needle into the body vessel. Next the needle is removed from the body vessel and removed from the coil spring guide.

With the coil spring guide started in the vessel, the plastic catheter is threaded over the guide and is pushed to within three to four centimeters of the distal tip of the guide whereby the guide may be used as a leader for the catheter. The catheter and guide are then advanced in the artery or vein to the injection sight. When the injection sight is reached, the guide is withdrawn and the catheter is connected to a suitable high pressure injection apparatus which fires dye into the body vessel. During the injection procedure, an X-ray filming operation permits a visualization of the suspected abnormality.

In theory, the above described procedure is excellent. It has been found, however, that because the coil spring guide is fragile, it can break so that a portion of the guide is left in the vessel. In addition, manipulation of the coil spring guide is difficult because it is impossible to transmit torque from the hand of the doctor up the guide to the distal end thereof. Thus, control of the tip of the guide is difficult or impossible.

It is, therefore, one object of the present invention to provide an improved coil spring guide which is controllable to rotate the tip of the guide and to angle or aim the distal tip of the guide so that it can be guided into body vessels having passages arranged at angles to one another.

Still another object of the invention is to provide a coil spring guide which can be easily withdrawn from a body vessel even though the coil spring of the guide becomes broken. Still another object of the invention is to provide an improved coil spring guide and method of using a coil spring guide.

Related objects and advantages will become apparent as the description proceeds.

One embodiment of the coil spring guide of the present invention might include a coil spring and a wire secured to and extending between the opposite ends of said coil spring. One embodiment of the method of the present invention might include projecting a wire through a coil spring and securing the end of the wire to one end of the coil spring, placing a bend in the wire adjacent the one end of the coil spring to give the coil spring a J-shape, and straightening the J-shape as needed to thread a body vessel by making the wire more taut in the coil spring and thereby pulling together the coils of the coil spring.

The full nature of the invention will be understood from the accompanying drawings and the following description and claims.

FIG. 5 is an enlarged sectional view taken along the axis of the coil spring guide of the present invention with portions of the structure broken away.

FIG. 6 is a reduced side elevation of the coil spring guide of FIG. 5 showing it in different operating positions.

FIG. 7 is a reduced view similar to FIG. 6 showing the coil spring guide of the present invention in a body vessel and showing the manner in which the guide is used to guide the catheter through alternative passages in the body vessel.

FIG. 8 is a view similar to FIG. 5 of an alternative embodiment of the invention.

Figure 1:
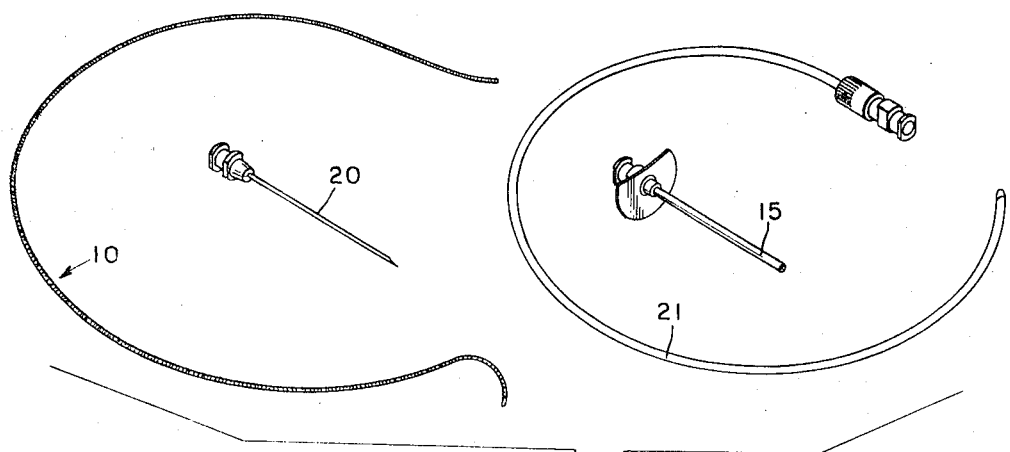
FIG. 1 is a perspective view of a hypodermic needle, a point for the needle, a catheter and the coil spring guide of the present invention, all of said devices being used in the above mentioned catheterization by the percutaneous entry technique.
Figures 2, 3:
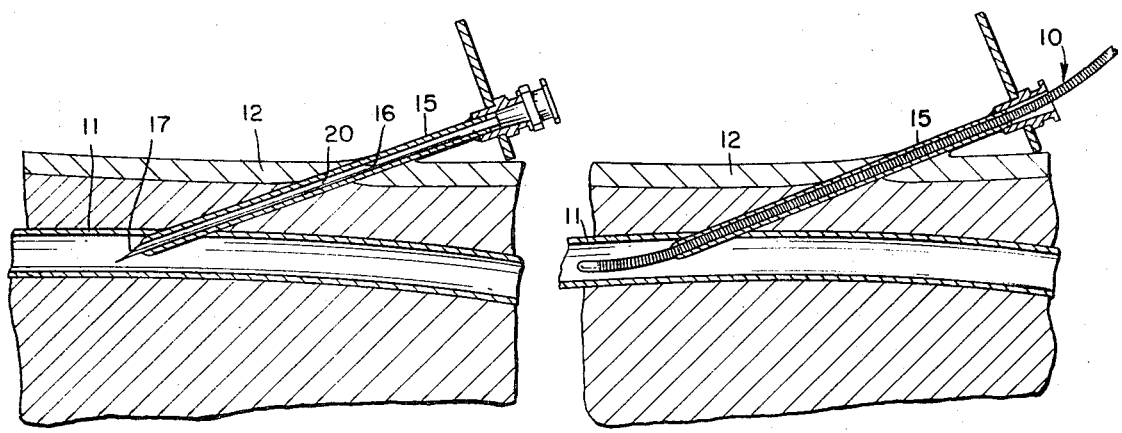
FIG. 2 is a sectional view of the hypodermic needle and point of FIG. 1 showing them as they are used in the percutaneous entry technique.
FIG. 3 is a view similar to FIG. 2 of a further step in the technique showing the insertion of the coil spring guide through the lumen of the needle.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings, there is illustrated the coil spring guide of the present invention. The coil spring guide 10 is threaded into the body vessel 11 by first puncturing the skin 12 by means of a hypodermic needle 15 having a relatively large diameter opening 16 therethrough. In order to puncture the skin 12 the needle is provided with a sharp point or cutting edge 17 which is formed upon the additional member 20. After the skin 12 and body vessel 11 have been suitably punctured in order to cause the hypodermic needle 15 to properly project into the body vessel 11, the member 20 is removed from the needle 15.

Figure 4:
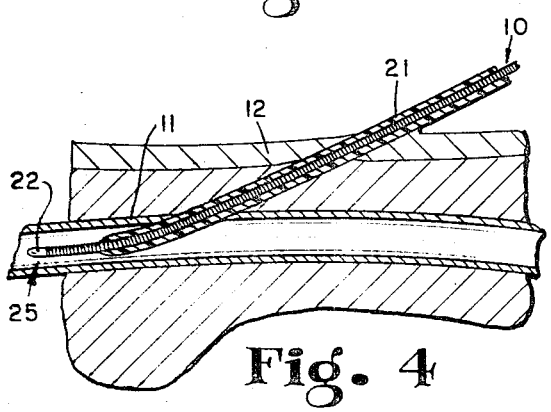
FIG. 4 is a section showing a further step in the technique wherein the needle of FIGS. 2 and 3 has been removed and the catheter of FIG. 1 is received about the coil spring guide of the present invention adjacent the distal end thereof.

In order to catheterize the body vessel 11, the guide 10 of the present invention is then inserted into the vessel 11 through the needle 15. Next the needle 15 is removed from the guide 10 and the catheter 21 is threaded onto the guide as shown in FIG. 4, preferably to a location which is removed from the tip member 22 at the distal end of the coil spring guide by approximately 3 to 4 centimeters. As the further steps of the procedure are carried out, the catheter 21 and the coil spring guide 10 are retained together as they move through the body vessel or vessels 11. Thus, the flexible tip portion 25 of the coil spring guide 10 which extends from the catheter 21 provides a flexible tip in front of the catheter which functions to prevent inadvertent puncture of the vessel 11 during the entubation procedure.

Referring to FIGS. 5 and 6, the details of applicant's coil spring guide are shown as including the tightly wound coil spring 30 which has tip members 31 and 22 secured to the opposite ends thereof. The coil spring 30 and the tip members 31 and 22 may have a length as great as 145 centimeters or greater, if desired, with an average length being 125 centimeters. The diameter of the coil 30 can range from approximately .025 inches to approximately .052 inches and, of course, depends upon the size of the catheter to be placed in the body vessel which in turn depends upon the size of the body vessel. Each of the tip members 31 and 22 may be, for example, solder while the coil spring 30 is formed of spring steel. A mandrel 35 having a diameter of approximately .012 inches to approximately .021 inches is secured to the end 31 of the coil spring guide 10. The mandrel 35 has a tapered distal end 36 which may have a length of approximately 3 to 6 centimeters. The mandrel 35 provides stiffness and rigidity to the coil spring guide 10 while the tapered distal end 36 of the mandrel provides a gradually lessening stiffness between the main portion of the coil spring guide and the tip portion 25.

Connected to and embedded within the solder 31 and 22 at the opposite ends of the coil spring guide 10 is a relatively fine wire 37 which has an approximate diameter of .005 to .002 inches. The fine wire 37 has a distal end portion 40 which is curved through a part-circular shape and which causes the portion 25 of the coil spring guide 10 to normally assume the curved configuration shown in solid lines in FIG. 5 and shown in dotted lines in FIG. 6. The coil spring guide 10 may be caused to straighten by grasping the coil spring 30 with the finger and thumb 50 and 51 and by also grasping the coil spring 30 with the other finger and thumb 52 and 53 and pulling the two portions 54 and 55 of the coil spring apart so as to produce spacing between the coils of the coil spring. When this is accomplished, the coils at the tip portion 25 are caused to be pulled together by the wire 37 becoming taut thus causing the coil spring portion 25 to straighten out as shown in solid lines in FIG. 6.

Since the coil spring guide 10 is visible by suitable X-ray means when it is moving through the body vessels, the doctor can manipulate the tip portion 25 of the guide 10 by pulling the portions 54 and 55 apart as above described so as to cause the tip portion 25 to go into the proper passage 60, 61 or 62 as desired (See FIG. 7). It should be understood that the wire 37 also provides a means for transmitting torque along the coil spring 10. As mentioned above, the coil spring 10 without such a wire 37 cannot transmit any substantial torque while the wire 37 makes possible the transmission of sufficient torque to project the bent portion 25 of the coil spring guide 10 in any desired direction. With regard to the transmission of torque, preferably the solder tip member 31 extends an inch or two along the length of the coil spring 30 from the end thereof. This, in effect, provides a solid bar at 55 extending from the end of the coil spring guide 10 through the portion 55 where it can be gripped by the thumb 53 and finger 52, said solid bar having the mandrel 35 and the wire 37 embedded therein. To provide even better torque transmission to the portion 25, the coil spring 30, mandrel 35 and wire 37 can be soldered together at spaced intervals along the length of the coil spring as illustrated in FIG. 8 at 58.

It will be evident from the above description that the present invention provides a coil spring guide which can be controlled to rotate the guide or to angle or aim the direction of the tip of the guide at any desired angle into a body vessel having passages which extend at an angle to one another. It will also be evident that the coil spring guide of the present invention can be withdrawn from a body vessel even though the coil spring of the guide becomes broken. This is accomplished by reason of the fact that the wire 37 still provides a connection between the broken off tip of the coil spring guide 10 and the main portion of the coil spring guide. Thus, even though the coil spring 30 may become severed at some point along its length, the tip portion of the coil spring guide is removed from the body vessel by pulling out the main portion of the coil spring guide.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

I claim:

1. A method of threading a body vessel with a flexible coil spring which comprises projecting a wire through a coil spring and securing the end of the wire to one end of the coil spring, placing a bend in the wire adjacent the one end of the coil spring to give the coil spring a J-shape, and straightening the J-shape as needed to thread a body vessel by making the wire more taut in the coil spring and thereby pulling together the coils of the coil spring.

2. The method of claim 1 additionally comprising the steps prior to said straightening of:
    puncturing said vessel with a cutting member slidable within a hypodermic needle;
    projecting said needle into the vessel opening formed by said puncturing;
    withdrawing said member from said needle;
    threading a spring guide through said needle into said vessel;
    withdrawing said needle from said vessel in such a manner so as to leave said guide threaded in said vessel;
    threading said coil through said guide into said vessel.

3. The method of claim 1 wherein said securing of the one end of the thusly contained wire is by soldering, and the additional step prior to said straightening step of soldering said wire to the coil spring at the proximal end thereof and at spaced intervals along the length of said coil spring.

4. A method of threading a body vessel in the vascular system of the body with a single continuous flexible coil spring which comprises projecting a wire through the continuous hollow interior of a coil spring wherein a plurality of adjacent coils define said continuous hollow interior and said wire is thusly contained within said hollow interior, securing the end of the thusly contained wire to the distal end of the end portion of the coil spring which end portion encloses only said wire and has a given configuration with at least portions of said coils spaced from one another, and changing said given configuration as needed to thread a body vessel by making the wire more taut in the coil spring and thereby pulling together the coils of the end portion of the coil spring.